US009704479B2

(12) United States Patent
Tsuji et al.

(10) Patent No.: US 9,704,479 B2
(45) Date of Patent: Jul. 11, 2017

(54) SPEECH RECOGNITION DEVICE

(71) Applicant: DENSO CORPORATION, Kariya, Aichi-pref. (JP)

(72) Inventors: Hideaki Tsuji, Nagoya (JP); Satoshi Miyaguni, Kariya (JP)

(73) Assignee: DENSO CORPORATION, Kariya (JP)

( * ) Notice: Subject to any disclaimer, the term of this patent is extended or adjusted under 35 U.S.C. 154(b) by 22 days.

(21) Appl. No.: 14/384,400

(22) PCT Filed: Jan. 29, 2013

(86) PCT No.: PCT/JP2013/000458
§ 371 (c)(1),
(2) Date: Sep. 11, 2014

(87) PCT Pub. No.: WO2013/157174
PCT Pub. Date: Oct. 24, 2013

(65) Prior Publication Data
US 2015/0100317 A1  Apr. 9, 2015

(30) Foreign Application Priority Data

Apr. 16, 2012  (JP) .................................. 2012-93014

(51) Int. Cl.
*G10L 15/06*  (2013.01)
(52) U.S. Cl.
CPC .................... *G10L 15/06* (2013.01)
(58) Field of Classification Search
CPC ..... G10L 15/00; G10L 15/063; G10L 15/065; G10L 15/20; G10L 15/26; G10L 15/265; G10L 15/30

(Continued)

(56) References Cited

U.S. PATENT DOCUMENTS 6,304,523 B1   10/2001  Jones et al.
8,639,214 B1 *  1/2014  Fujisaki ................. G06Q 20/32
                                                        379/88.03

(Continued)

FOREIGN PATENT DOCUMENTS

JP         3911178 B2       5/2007
JP      2011-039202 A       2/2011

(Continued)

OTHER PUBLICATIONS

Japanese Office Action mailed on Oct. 6, 2015 in the corresponding JP Application No. 2012-93014. (English translation attached).

(Continued)

*Primary Examiner* — Qi Han
(74) *Attorney, Agent, or Firm* — Posz Law Group, PLC

(57) ABSTRACT

A speech recognition device starts to generate dictionary data for each type of name based on name data and paraphrase data, and executes dictionary registration of the dictionary data. The speech recognition device obtains text information same as text information for generating the dictionary data last time. When back-up data corresponding to the last time text information is generated, the speech recognition device executes the dictionary registration of the dictionary data generated as the back-up data. Further, a dictionary data generation device executes the dictionary registration of the dictionary data based on given name data every time the dictionary data generation device completes generation of the dictionary data based on the given name data.

17 Claims, 12 Drawing Sheets

(58) Field of Classification Search
USPC .............. 704/243, 231, 235, 244, 246, 251
See application file for complete search history.

(56) References Cited

U.S. PATENT DOCUMENTS

| | | |
|---|---|---|
| 2002/0048224 A1 | 4/2002 | Dygert et al. |
| 2004/0098263 A1* | 5/2004 | Hwang .................. G10L 15/18 704/266 |
| 2004/0181391 A1 | 9/2004 | Inoue et al. |
| 2008/0262843 A1* | 10/2008 | Katsuragawa .......... G10L 15/08 704/253 |
| 2010/0299143 A1 | 11/2010 | Takeda et al. |
| 2011/0131038 A1* | 6/2011 | Oyaizu .................. G10L 15/06 704/10 |
| 2012/0239399 A1* | 9/2012 | Yamazaki ............... G10L 15/22 704/243 |

FOREIGN PATENT DOCUMENTS

| | | |
|---|---|---|
| JP | 2011-064969 A | 3/2011 |
| JP | 2011-095498 A | 5/2011 |
| JP | 2011-150169 A | 8/2011 |

OTHER PUBLICATIONS

International Search Report of the International Searching Authority mailed Feb. 26, 2013 for the corresponding international application No. PCT/JP2013/000458 (and English translation).

Written Opinion of the International Searching Authority mailed Feb. 26, 2013 for the corresponding international application No. PCT/JP2013/000458 (and English translation).

\* cited by examiner

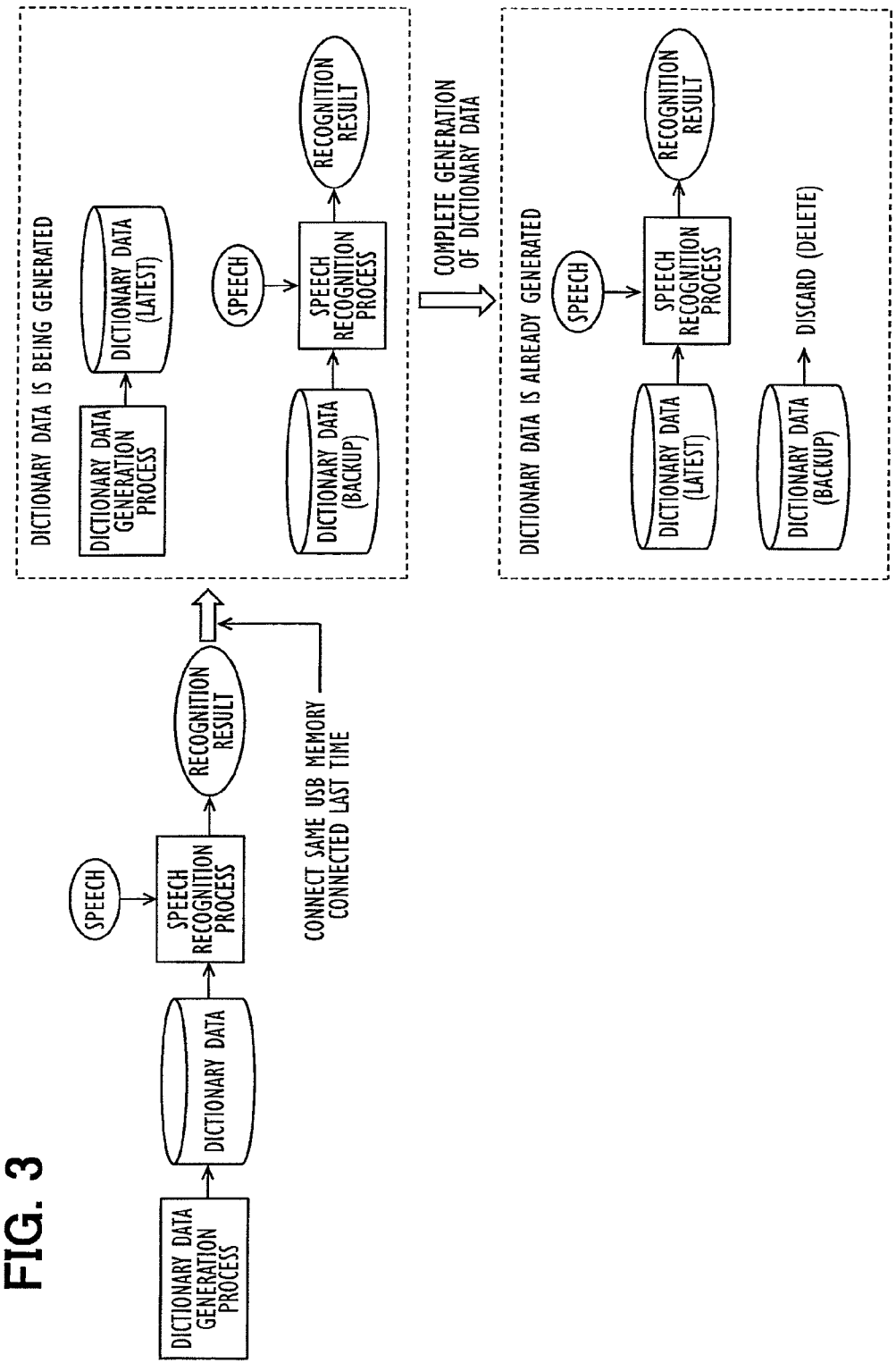

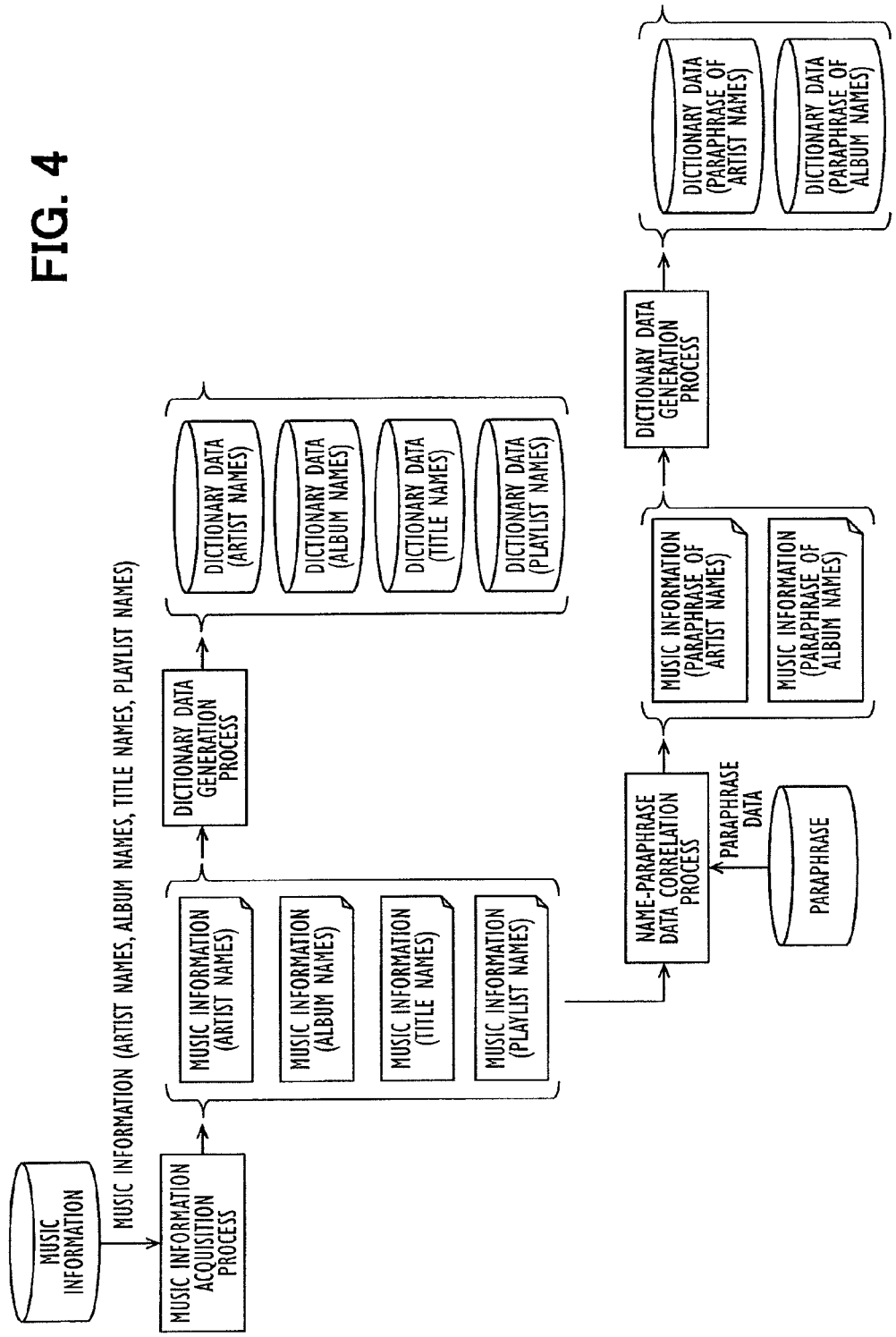

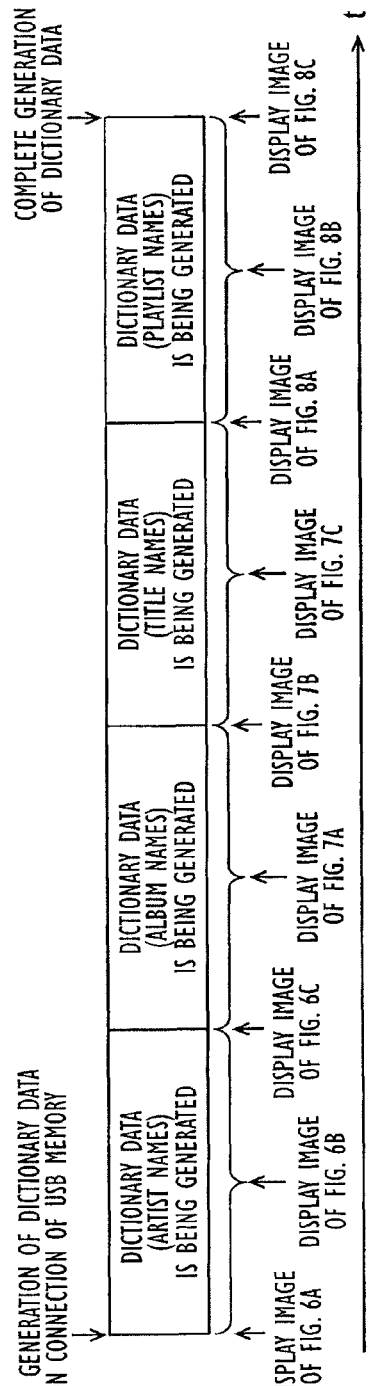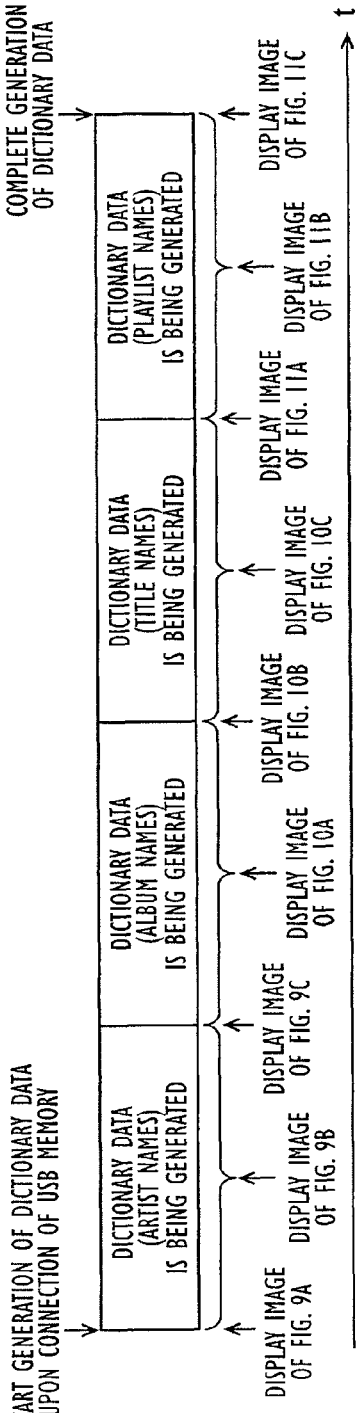

FIG. 7A

MUSIC SEARCH SPEECH RECOGNITION IS AVAILABLE ONLY BY ARTIST RECOGNITION. PLEASE TRY AGAIN LATER FOR RECOGNITION BY OTHERS (ALBUMS, TITLES, AND PLAYLISTS).

FIG. 7B

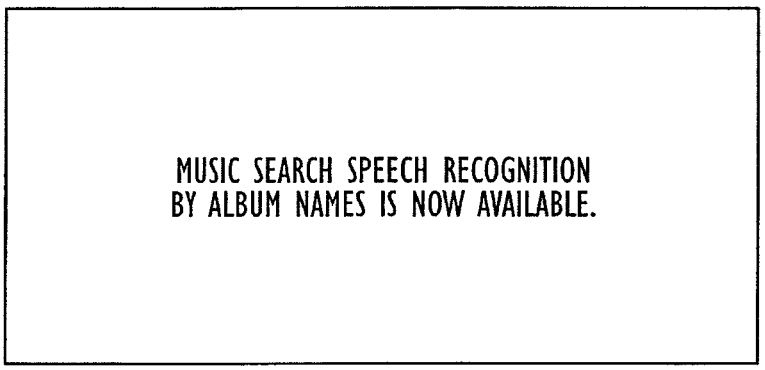

MUSIC SEARCH SPEECH RECOGNITION BY ALBUM NAMES IS NOW AVAILABLE.

FIG. 7C

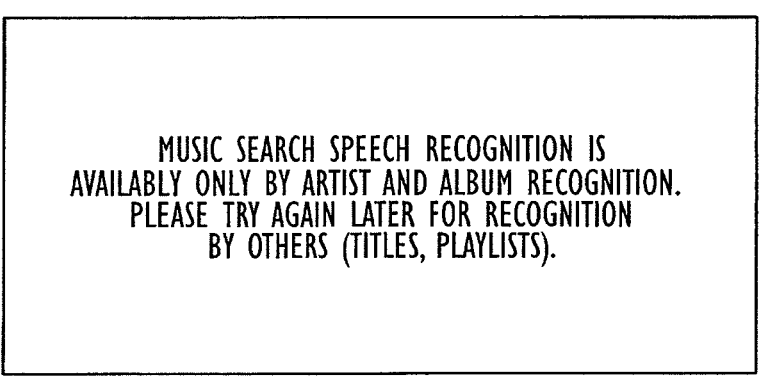

MUSIC SEARCH SPEECH RECOGNITION IS AVAILABLY ONLY BY ARTIST AND ALBUM RECOGNITION. PLEASE TRY AGAIN LATER FOR RECOGNITION BY OTHERS (TITLES, PLAYLISTS).

MUSIC SEARCH SPEECH RECOGNITION
BY TITLE NAMES IS NOW AVAILABLE.

MUSIC SEARCH SPEECH RECOGNITION IS AVAILABLE
ONLY BY ARTIST, ALBUM, AND TITLE RECOGNITION.
PLEASE TRY AGAIN LATER FOR RECOGNITION
BY OTHER (PLAYLISTS).

MUSIC SEARCH SPEECH RECOGNITION
BY PLAYLIST NAMES IS NOW AVAILABLE.
ALL FUNCTIONS OF MUSIC SEARCH SPEECH
RECOGNITION ARE NOW AVAILABLE.

FIG. 9A

```
MUSIC SEARCH DICTIONARY IS BEING GENERATED.
MUSIC SEARCH SPEECH RECOGNITION USES DICTIONARY
GENERATED LAST TIME FOR RECOGNITION.
NEWLY ADDED MUSIC IS NOT RECOGNIZABLE.
SORRY FOR THE INCONVENIENCE.
```

FIG. 9B

```
MUSIC SEARCH DICTIONARY IS BEING GENERATED.
MUSIC SEARCH SPEECH RECOGNITION USES DICTIONARY
GENERATED LAST TIME FOR RECOGNITION.
PLEASE TRY AGAIN LATER FOR RECOGNITION
WITH DEVICE CONNECTED NOW.
```

FIG. 9C

```
MUSIC SEARCH DICTIONARY OF ARTIST NAMES IS
UPDATED TO LATEST DICTIONARY.
```

FIG. 11A

MUSIC SEARCH DICTIONARY OF TITLE NAMES IS
UPDATED TO LATEST DICTIONARY.

FIG. 11B

MUSIC SEARCH DICTIONARY IS BEING GENERATED.
MUSIC SEARCH SPEECH RECOGNITION USES DICTIONARY
GENERATED LAST TIME FOR RECOGNITION.
ONLY RECOGNITION BY ARTISTS, ALBUMS, AND TITLES IS
AVAILABLE FOR DEVICE CONNECTED NOW.
PLEASE TRY AGAIN LATER FOR RECOGNITION
BY OTHER (PLAYLISTS).

FIG. 11C

MUSIC SEARCH DICTIONARY OF PLAYLIST NAMES IS
UPDATED TO LATEST DICTIONARY.
ALL DICTIONARIES FOR MUSIC SEARCH SPEECH
RECOGNITION ARE UPDATED TO LATEST CONDITIONS.

RECOGNIZED MUSIC IS NOT FOUND IN
DEVICE CONNECTED NOW AND NOT PLAYABLE.

SPEECH RECOGNITION DEVICE

CROSS REFERENCE TO RELATED APPLICATION

The present disclosure is a U.S. national stage application of PCT/JP2013/000458 filed on Jan. 29, 2013 and is based on Japanese Patent Application No. 2012-93014 filed on Apr. 16, 2012, the disclosures of which are incorporated herein by reference.

TECHNICAL FIELD

The present disclosure relates to a speech recognition device that performs speech recognition of a speech by acquiring text information containing a plurality of name data from a device, generating dictionary data by applying dictionary conversion to the name data contained in the acquired text information, and registering the generated dictionary data into a dictionary.

BACKGROUND ART

A speech recognition device that performs speech recognition of a speech relating, for example, to music is popular (see Japanese Patent No. 3911178).

When performing speech recognition of a speech relating to music, the speech recognition device acquires music information from a device, for example, a USB (Universal Serial Bus) memory. The speech recognition device generates dictionary data by applying dictionary conversion to name data of names (artist names, album names, title names, playlist names, and so on) contained in the acquired music information and registers the generated dictionary data into a dictionary. The speech recognition device performs speech recognition using the dictionary data registered in the dictionary.

In the related art, however, generation of the dictionary data is started after all name data contained in the music information is acquired (after a full set of name data is acquired), that is, generation of the dictionary data is not started until all the name data contained in the music information is acquired. Hence, when the number of pieces of music information as subjects for which the dictionary data is to be generated is large and a data volume of the music information is increased, it takes a long time until generation of the dictionary data is started. Consequently, the related art has a problem that it takes a long time after the device is connected to the speech recognition device until speech recognition becomes available.

Also, in a case where the dictionary data was generated the last time a device was connected and the same device is connected again, when the music information stored in the device is changed (added or deleted) even slightly since the last time the device was connected, the dictionary data generated at the last connection is discarded and new dictionary data is generated from the start. Hence, the related art has a problem that even when only a slightest amount of music information is changed, speech recognition becomes unavailable over too long a period for a data volume of slightly changed music information.

PRIOR ART LITERATURES

Patent Literature

Patent Literature 1: Japanese Patent No. 3911178

SUMMARY OF INVENTION

It is an object of the present disclosure to provide a speech recognition device that can improve convenience owing to a capability of appropriately securing a period during which speech recognition is available by minimizing a period during which speech recognition is unavailable.

According to a first aspect of the present disclosure, a speech recognition device includes: a text information acquisition device that acquires text information including a plurality of name data from an external device; a dictionary data generation device that generates dictionary data based on the plurality of name data included in the text information; a dictionary data saving control device that controls a dictionary data saving device to store the dictionary data; a dictionary registration device that registers the dictionary data into a dictionary; a speech recognition device that performs speech recognition using the dictionary data registered in the dictionary; and a backup data generation device that generates backup data of the dictionary data stored in the dictionary data saving device. The dictionary data generation device generates the dictionary data for each type of name based on the name data. In a case where text information same as text information acquired from the external device at a present moment has been obtained last time from the external device, and backup data corresponding to the text information is already generated by the backup data generation device, the dictionary registration device registers the dictionary data generated as the backup data into the dictionary, and the dictionary registration device registers the dictionary data based on given name data into the dictionary every time the dictionary data generation device completes generation of dictionary data based on the given name data.

In the related art, generation of dictionary data is started after all name data contained in text information is acquired (after a full set of name data is acquired). However, different from the related art, generation of dictionary data based on name data is started from one type of name to another and, upon completion of the generation, the dictionary data is registered into the dictionary. Hence, the speech recognition device can perform speech recognition using the dictionary data registered in the dictionary. When dictionary data based on one name data is registered in the dictionary, the speech recognition device can perform speech recognition using the dictionary data based on this name data even when the dictionary data based on the other name data is not registered in the dictionary.

Also, in the related art, when text information is acquired from a device same as the device for which the dictionary data was generated last time, the dictionary data generated last time is discarded and new dictionary data is generated from the start. However, different from the related art, when the backup data corresponding to the text information acquired last time from the device same as the device from which text information is to be acquired this time is already generated, by registering the dictionary data generated as the backup data into the dictionary, the speech recognition device can perform speech recognition using the dictionary data registered in the dictionary.

In this manner, when the backup data is already generated when the device is determined as being the same device used last time, by registering the dictionary data of the backup data into the dictionary, the speech recognition device can perform speech recognition using the dictionary data of the backup data registered in the dictionary before the text information is acquired. On the other hand, by starting generation of dictionary data based on the name data from one type of name to another and by registering the latest dictionary data into the dictionary upon completion of the generation (replace the dictionary data of the backup data with the latest dictionary data), the speech recognition device can perform speech recognition sequentially (step-by-step) using the latest dictionary data registered in the dictionary.

BRIEF DESCRIPTION OF DRAWINGS

The above and other objects, features and advantages of the present disclosure will become more apparent from the following detailed description made with reference to the accompanying drawings. In the drawings:

FIG. 3 is a diagram showing a manner in which dictionary data is generated;

FIG. 4 is a diagram showing a manner in which dictionary data relating to music information is generated;

FIGS. 5A and 5B are diagrams showing a correspondence between a time sequence and display screens when dictionary data is generated;

FIGS. 7A through 7C are diagrams showing different display screens;

FIGS. 9A through 9C are diagrams showing different display screens;

FIGS. 11A through 11C are diagrams showing different display screens; and

EMBODIMENTS FOR CARRYING OUT INVENTION

Figure 1:
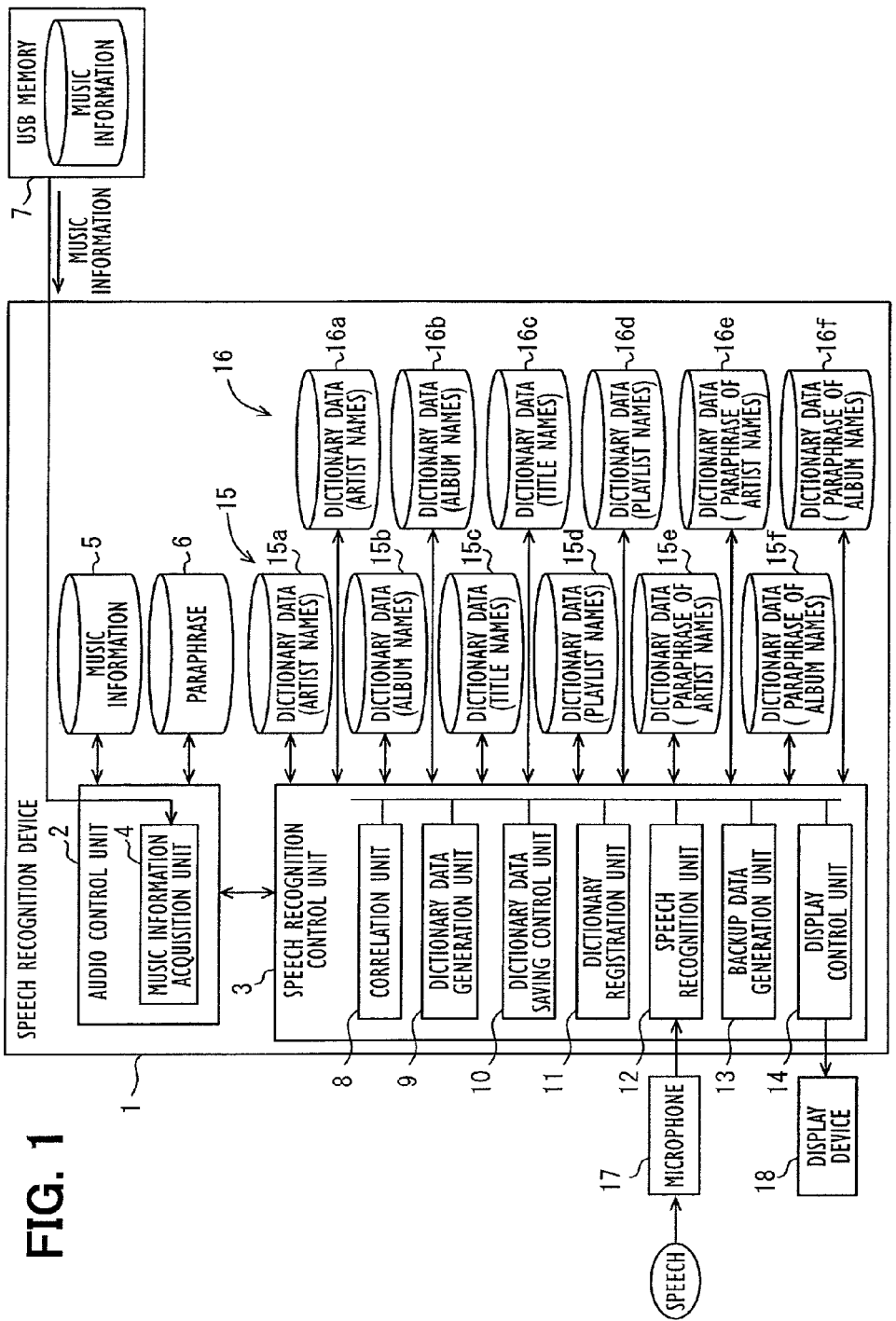
FIG. 1 is a functional block diagram showing one embodiment disclosed here.
Figure 2:
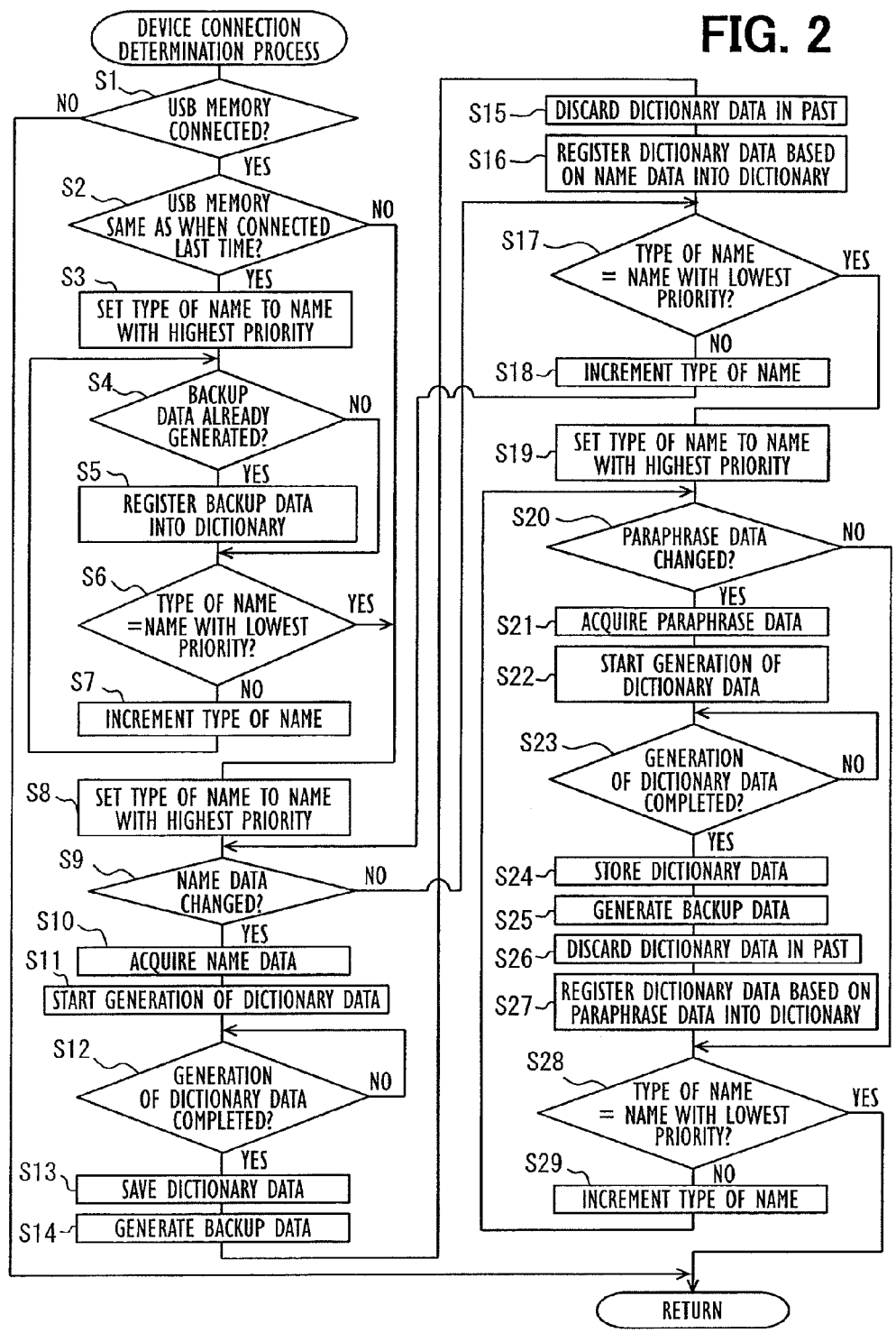
FIG. 2 is a flowchart depicting device connection determination processing.

Hereinafter, a description will be given with reference to the drawings to one embodiment in which this disclosure is applied to a speech recognition device formed to be installable to a vehicle and having a connection interface with an USB (Universal Serial Bus) memory capable of storing music information (corresponding to text information). The phrase, "installable to a vehicle", means that the speech recognition device can be either of so-called a stationary type fixedly attached to a vehicle or so-called a portable type reattachable to a vehicle. A speech recognition device 1 has an audio control unit 2 controlling processing to playback music and a speech recognition control unit 3 controlling processing to generate dictionary data and processing to perform speech recognition of a speech. The audio control unit 2 and the speech recognition control unit 3 are formed so that various types of data can be transferred mutually.

The audio control unit 2 has a CPU formed of a known micro-computer, a RAM, a ROM, I/O bus, and so on and performs processing to playback music by running a pre-stored control program. Owing to its function, the audio control unit 2 has a music information acquisition unit 4 (corresponding to text information acquisition device) and connects to a music information database 5 capable of saving a plurality of name data contained in music information and a paraphrase database 6 capable of saving paraphrase data correlated with names. When a USB memory 7 (corresponding to the device) is physically connected to a main body (not shown) of the speech recognition device 1, the music information acquisition unit 4 acquires (inputs therein) music information stored in the USB memory 7 from the USB memory 7 and saves the acquired music information in the music information database 5.

The music information is made up, for example, of an mp3 file, a wmv file, and so on. The plurality of name data contained in the music information include name data of artist names, name data of album names, name data of title names, name data of playlist names, and so on. The paraphrase data is correlated with names as described above. For example, when the paraphrase data is correlated with two different names, for example, artist names and album names, the paraphrase data includes paraphrase data corresponding to artist names and paraphrase data corresponding to album names. This embodiment describes a case where the paraphrase data includes two types: paraphrase data corresponding to artist names and paraphrase data corresponding to album names. It should be appreciated, however, that the paraphrase data may instead include paraphrase data corresponding to title names and paraphrase data corresponding to playlist names. Further, the paraphrase database 6 may be omitted. That is, names are not necessarily correlated with the paraphrase data.

The speech recognition control unit 3 has a CPU formed of a known micro-computer, a RAM, a ROM, an I/O bus, and so on and performs processing to generate dictionary data and processing to perform speech recognition of a speech by running a pre-stored control program. Owing to its function, the speech recognition control unit 3 has a correlation unit 8 (corresponding to correlation device), a dictionary data generation unit 9 (corresponding to dictionary data generation device), a dictionary data saving control unit 10 (corresponding to dictionary data saving control device), a dictionary registration unit 11 (corresponding to dictionary registration device), a speech recognition unit 12 (corresponding to speech recognition device), a backup data generation unit 13 (corresponding to backup data generation device), and a display control unit 14 (corresponding to notification control device), and connects to dictionary databases 15 and 16 (corresponding to dictionary data saving device) capable of saving dictionary data.

The correlation unit 8 correlates names in the music information acquired from the music information database 5 with paraphrase data acquired from the paraphrase database 6. The dictionary data generation unit 9 has a G2P (Grapheme to Phoneme) conversion function as a dictionary data generation function, and generates dictionary data by applying dictionary conversion to name data acquired from the music information database 5. The dictionary data generation unit 9 also generates dictionary data by applying dictionary conversion to paraphrase data acquired from the paraphrase database 6. In this case, the dictionary data generation unit 9 starts generation of dictionary data based on the name data and the paraphrase data from one type of name to another (a detailed description will be given below).

The dictionary data saving control unit 10 controls either the dictionary database 15 or 16 whichever is set as a latest save region (a detailed description will be given below) to save dictionary data generated by the dictionary data generation unit 9. The dictionary registration unit 11 registers dictionary data saved in the dictionary databases 15 and 16 in a dictionary. The speech recognition unit 12 connects to a microphone 17 that collects a speech uttered from a user.

Hence, when a speech uttered from the user is collected by the microphone 17 and the speech is inputted from the microphone 17, the speech recognition unit 12 performs speech recognition of this speech using the dictionary data registered in the dictionary by the dictionary registration unit 11. In this case, the speech recognition unit 12 outputs a recognition result of the speech recognition to the display control unit 14. Upon input of a recognition result from the speech recognition unit 12, the display control unit 14 controls a display device 18 (corresponding to notification device) formed, for example, of a liquid crystal display device to display a display screen exhibiting the recognition result.

The dictionary databases 15 and 16 are of so-called a two-sided configuration selectively switchable between a latest save region to a backup region and vice versa. The backup data generation unit 13 can selectively switch the dictionary databases 15 and 16 between the latest save region and the backup region, and generates the dictionary data saved in either one of the dictionary databases 15 and 16, which is set as the latest saver region, as the backup data. When the generating of the backup data is finished, the backup data generation unit 13 switches the one, which is set as the latest save region, to the backup region upon completion of the generating of the backup data while switching the other, which is set as the backup region, to the latest save region. The backup data generation unit 13 thus discards (deletes) the dictionary data (dictionary data in the past) saved as the backup data before the generation of the backup data is completed.

As has been described above, the dictionary data generation unit 9 starts generation of dictionary data of the name data and the paraphrase data from one type of name to another. In order to correspond to this configuration, the dictionary databases 15 and 16 include dictionary databases capable of saving dictionary data of each type of name data and dictionary databases capable of storing dictionary data of each type of paraphrase data. More specifically, the dictionary database 15 has a dictionary database 15a capable of saving dictionary data obtained by applying dictionary conversion to name data of artist names, a dictionary database 15b capable of saving dictionary data obtained by applying dictionary conversion to name data of album names, a dictionary database 15c capable of saving dictionary data obtained by applying dictionary conversion to name data of title names, a dictionary database 15d capable of saving dictionary data obtained by applying dictionary conversion to name data of playlist names, a dictionary database 15e capable of saving dictionary data obtained by applying dictionary conversion to paraphrase data corresponding to artist names, and a dictionary database 15f capable of saving dictionary data obtained by applying dictionary conversion to paraphrase data corresponding to album names.

Likewise, the dictionary database 16 has a dictionary database 16a capable of saving dictionary data obtained by applying dictionary conversion to name data of artist names, a dictionary database 16b capable of saving dictionary data obtained by applying dictionary conversion to name data of album names, a dictionary database 16c capable of saving dictionary data obtained by applying dictionary conversion to name data of title names, a dictionary database 16d capable of saving dictionary data obtained by applying dictionary conversion to name data of playlist names, a dictionary database 16e capable of saving dictionary data obtained by applying dictionary conversion to paraphrase data corresponding to artist names, and a dictionary database 16f capable of saving dictionary data obtained by applying dictionary conversion to paraphrase data corresponding to album names. It is desirable for the dictionary databases 15 and 16 that a pair saving corresponding dictionary data has no difference in storage capacity, data writing speed, data reading speed, and so on.

The speech recognition device 1 described above may be, for example, a navigation device furnished with a speech recognition function. In a case where the speech recognition device 1 is a navigation device furnished with a speech recognition function, in addition to the functions described above, the speech recognition device 1 is furnished with known functions for navigation, such as a function of specifying a current position of the vehicle, a function of reading out map data from a recording medium, a function of map-matching a road on which the current position of the vehicle is present using the current position of the vehicle and road data contained in the map data, a function of searching for a route from the current position of the vehicle to a goal set by the user, a function of providing a route guidance by calculating points necessary for the route guidance on the basis of the searched route and the road data contained in the map data, and a function of drawing a map around the current position of the vehicle, an outline of expressways, and an enlarged map near an intersection. In this case, the display device 18 may be a device that displays a map around the current position of the vehicle.

With reference to FIG. 2 through FIG. 12, a description will now be given to device connection determination processing performed by the speech recognition control unit 3 in connection with this disclosure as a function of the configuration described above. A description will be given on the assumption that an order of priority when generating dictionary data based on the name data is an order of artist names, album names, title names, and playlist names, and an order of priority when generating dictionary data based on the paraphrase data is an order of artist names and album names.

When the device connection determination processing is started, the speech recognition control unit 3 determines whether the USB memory 7 is connected to the speech recognition device 3 (Step S1). Upon determining that the USB memory 7 is connected to the speech recognition device 3 (Step 1: YES), the speech recognition control unit 3 determines whether the connected USB memory 7 is the same as was connected last time (Step S2). Here, the speech recognition control unit 3 determines whether the connected USB memory 7 is the same as was connected last time by identifying unique identification information (for example, product serial number) inputted therein from the USB memory 7.

Upon determining that the connected USB memory 7 is the same as was connected last time (Step S2: YES), the speech recognition control unit 3 first registers dictionary data based on name data saved as the backup data into the dictionary. More specifically, the speech recognition control unit 3 sets a type of name to the name (artist names in this embodiment) with the highest priority among the name data (Step S3), and determines whether the dictionary data based on the name data of the set name is saved as backup data in either the dictionary database 15 or 16 (Step S4).

Upon determining that the dictionary data based on the name data of the set name is saved as the backup data in either the dictionary database 15 or 16 (Step S4: YES), the speech recognition control unit 3 registers the dictionary data based on the name data saved as the backup data into the dictionary (Step S5). In other words, by registering the dictionary data based on the name data saved as the backup data into the dictionary, the speech recognition control unit 3 thereafter becomes able to perform speech recognition of an input speech using the dictionary data of the backup data registered in the dictionary.

Subsequently, the speech recognition control unit 3 determines whether the type of name is set to the name (playlist names in this embodiment) with the lowest priority among the name data (Step S6). Upon determining that the type of name is not set to the name with the lowest priority among the name data (Step S5: NO), the speech recognition control unit 3 increments the type of name (sets the name with the next priority) (Step S7) and repeats Steps S4 through S6 described above. In other words, the speech recognition control unit 3 thereafter sets the type of name sequentially to album names, title names, and playlist names, and upon determining that the dictionary data based on the respective types of name data is saved as the backup data in either the dictionary database 15 or 16, the speech recognition control unit 3 registers the dictionary data based on the name data saved as the backup data into the dictionary.

On the other hand, upon determining that the type of name is set to the name with the lowest priority among the name data (Step S6: YES), the speech recognition control unit 3 completes the dictionary registration of the dictionary data based on the name data saved as the backup data. When the speech recognition control unit 3 completes the dictionary registration of the dictionary data based on the name data saved as the backup data in this manner, the speech recognition control unit 3 registers dictionary data based on paraphrase data saved as the backup data into the dictionary in the same manner.

Subsequently, when the speech recognition control unit 3 completes the dictionary registration of the dictionary data based on the paraphrase data saved as the backup data, the speech recognition control unit 3 registers the dictionary data based on the name data acquired from the USB memory 7 into the dictionary for each type of name. More specifically, the speech recognition control unit 3 sets the type of name to the name with the highest priority among the name data (Step S8) and determines whether the name data set for each type of name is changed since the last connection (Step S9). In other words, the speech recognition control unit 3 determines whether the name data set for each type of name is changed since the last connection by checking the name data saved in the music information database 5 against the dictionary data saved as the backup data in either the dictionary database 15 or 16.

Upon determining that the name data set for each type of name is changed since the last connection (Step S9: YES), the speech recognition control unit 3 acquires the changed name data from the music information database 5 (Step S10). The speech recognition control unit 3 starts generation of dictionary data by applying dictionary conversion to the acquired name data (Step S11) and determines whether generation of the dictionary data based on this name data is completed (Step S12). Upon determining that the generation of the dictionary data based on this name data is completed (Step S12: YES), the speech recognition control unit 3 controls either the dictionary database 15 or 16 whichever is set as the latest save region to save the generated dictionary data based on the name data (Step S13).

The speech recognition control unit 3 generates the dictionary data saved in either the dictionary database 15 or 16 whichever is set as the latest save region as backup data (Step S14). In this instance, the speech recognition control unit 3 switches the one set as the latest save region to the backup region from the latest save region upon completion of the generation of the backup data. Also, the speech recognition control unit 3 switches the other set as the backup region to the latest save region from the backup region. Hence, the speech recognition control unit 3 discards the dictionary data (dictionary data in the past) saved as the backup data up to this point (Step S15).

Thereafter, the speech recognition control unit 3 registers the name data generated as the backup data, that is, the dictionary data based on the name data acquired from the USB memory 7 by the connection of this time into the dictionary (Step S16). In other words, by registering the dictionary data based on the name data acquired from the USB memory 7 by the connection of this time into the dictionary, the speech recognition control unit 3 thereafter becomes able to perform speech recognition of an input speech using the latest dictionary data.

Subsequently, the speech recognition control unit 3 determines whether the type of name is set to the name (playlist names in this embodiment) with the lowest priority among the name data (Step S17). Upon determining that the type of name is not set to the name with the lowest priority among the name data (Step S17: NO), the speech recognition control unit 3 increments the type of name (sets the name with the next priority) (Step S18) and repeats Steps S9 through S17 described above. In other words, the speech recognition control unit 3 thereafter sets the type of name sequentially to album names, title names, and playlist names, and upon determining that the respective types of name data is changed, the speech recognition control unit 3 acquires the changed name data from the music information database 5 and generates dictionary data by applying dictionary conversion to the acquired name data.

On the other hand, upon determining that the type of name is set to the name with the lowest priority among the name data (Step S17: YES), the speech recognition control unit 3 completes the dictionary registration of the dictionary data based on the name data acquired from the USB memory 7.

Subsequently, the speech recognition control unit 3 registers the dictionary data based on the paraphrase data corresponding to the names into the dictionary for each type of name. More specifically, the speech recognition control unit 3 sets the type of name to the name with the highest priority among the paraphrase data (Step S19) and determines whether the paraphrase data set for each type of name is changed since the last connection (Step S20). In other words, the speech recognition control unit 3 determines whether the paraphrase data set for each type of name is changed since the last connection by checking the paraphrase data saved in the paraphrase database 5 against the dictionary data saved as the backup data in either the dictionary database 15 or 16.

Upon determining that the paraphrase data set for each type of name is changed since the last connection (Step S20: YES), the speech recognition control unit 3 acquires the changed paraphrase data from the paraphrase database 6 (Step S21). The speech recognition control unit 3 starts generation of dictionary data by applying dictionary conversion to the acquired paraphrase data (Step S22) and determines whether generation of the dictionary data based on this paraphrase data is completed (Step S23). Upon determining that generation of the dictionary data based on this paraphrase data is completed (Step S23: YES), the speech recognition control unit 3 controls either the dictionary database 15 or 16 whichever is set as the latest save region to save the generated dictionary data based on the paraphrase data (Step S24).

The speech recognition control unit 3 generates the dictionary data saved in either the dictionary database 15 or 16 whichever is set as the latest save region as backup data (Step S25). Upon completion of the generation of the backup data, the speech recognition control unit 3 switches the one set as the latest save region to the backup region from the latest save region. Also, the speech recognition control unit 3 switches the other set as the backup region to the latest save region from the backup region. Hence, the speech recognition control unit 3 discards the dictionary data (dictionary data in the past) saved as the backup data up to this point (Step S26).

Thereafter, the speech recognition control unit 3 registers the paraphrase data generated as the backup data, that is, the dictionary data based on the paraphrase data corresponding to the name acquired from the USB memory 7 by the connection of this time into the dictionary (Step S27). In other words, by registering the dictionary data based on the paraphrase data correspond to the name acquired from the USB memory 7 by the connection of this time into the dictionary, the speech recognition control unit 3 thereafter becomes able to perform speech recognition of an input speech using the latest dictionary data.

Subsequently, the speech recognition control unit 3 determines whether the type of name is set to the name (album names in this embodiment) with the lowest priority among the paraphrase data (Step S28). Upon determining that the type of name is not set to the name with the lowest priority among the paraphrase data (Step S28: NO), the speech recognition control unit 3 increments the type of name (sets the name with the next priority) (Step S29) and repeats Steps S20 through S28 described above. In other words, the speech recognition control unit 3 thereafter sets the type of name to the album names, and upon determining that the paraphrase data is changed, the speech recognition control unit 3 acquires the changed paraphrase data from the paraphrase database 6 and generates dictionary data by applying dictionary conversion to the acquired paraphrase data.

On the other hand, upon determining that the type of name is set to the name with the lowest priority among the paraphrase data (Step S28: YES), the speech recognition control unit 3 completes the dictionary registration of the dictionary data based on the paraphrase data corresponding to the name and returns to an initial stage by ending the device connection determination processing.

It should be noted that when the speech recognition control unit 3 determines that the connected USB memory 7 is not the same as was connected last time (Step S2: NO), the speech recognition control unit 3 skips to Step S8 without determining whether the backup data is saved. In this case, the speech recognition control unit 3 determines that the name data set for each type of name is changed since the last connection (Step S9: YES), and acquires the name data from the music information database 5 (Step S10). Thereafter, the speech recognition control unit 3 performs the processing in the same manner as above.

Also, upon determining that the name data set for each type of name is not changed since the last connection (Step S9: NO), the speech recognition control unit 3 skips to Step S17 without acquiring the name data from the music information database 5 nor starting generation of dictionary data. Also, upon determining that the paraphrase data set for each type of name is not changed since the last connection (Step S20: NO), the speech recognition control unit 3 skips to Step S28 without acquiring the paraphrase data from the paraphrase database 6 nor starting generation of dictionary data.

Owing to a series of processing performed by the speech recognition control unit 3 as described above, when the USB memory 7, for which the dictionary data was generated when connected last time, is connected to the speech recognition device 1, by registering the dictionary data based on the name data and the paraphrase data saved as the backup data into the dictionary, as is shown in FIG. 3, the speech recognition device 1 becomes able to perform speech recognition using the dictionary data generated as the backup data in a period during which new dictionary data is being generated.

Also, when the dictionary data based on the name data and the paraphrase data acquired from the USB memory 7 is generated, the speech recognition device 1 registers dictionary data into the dictionary by starting generation of the dictionary data from one type of name to another in a predetermined order of priority as is shown in FIG. 4. More specifically, generation of the dictionary data based on the name data is started and the dictionary data is registered into the dictionary in order of artist names, album names, title names, and playlist names. Thereafter, generation of dictionary data based on the paraphrase data is started and the dictionary data is registered into the dictionary in order of artist names and album names. Hence, the speech recognition device 1 becomes able to perform speech recognition using the dictionary data based on the name data and the paraphrase data for which the generation is completed.

Incidentally, the speech recognition device 1 controls the display device 18 to sequentially display display screens shown in FIG. 6A through FIG. 11C while the dictionary data based on the name data and the paraphrase data is being generated as described above, so that the user is notified of a degree of progress in generation of dictionary data. More specifically, in a case where no backup data is saved when the USB memory 7 is connected to the speech recognition device 1, by controlling the display device 18 to sequentially display the display screens shown in FIG. 6A through FIG. 8C at timing at which generation of dictionary data based on the name data of artist names, album names, title names, and playlist names is started, at timing in the course of the generation, and at timing at which the generation is completed, the speech recognition device 1 notifies the user of a degree of progress.

Figure 6A:
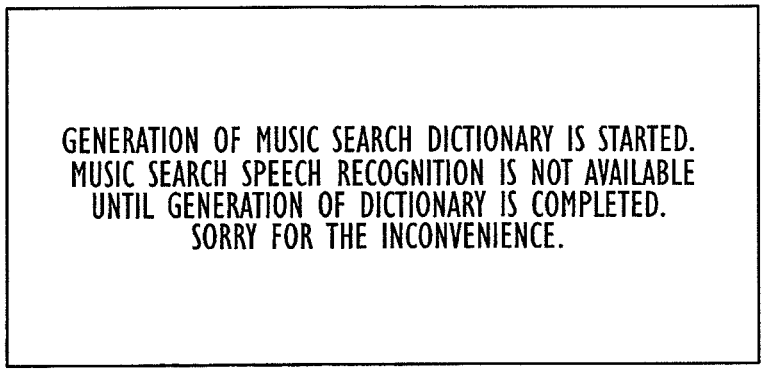
FIGS. 6A through 6C are diagrams showing display screens.
Figure 6B:
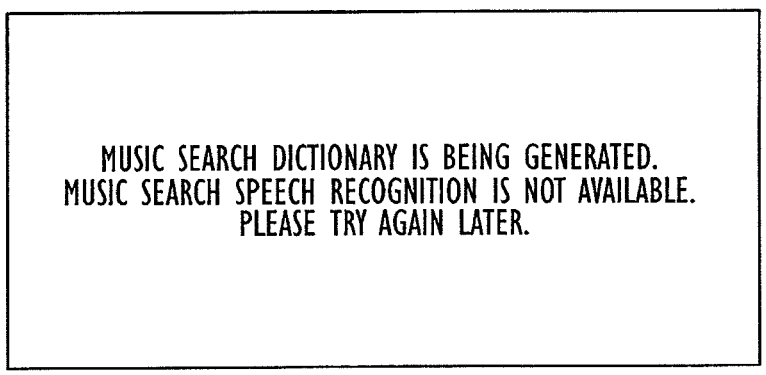
Figure 6C:
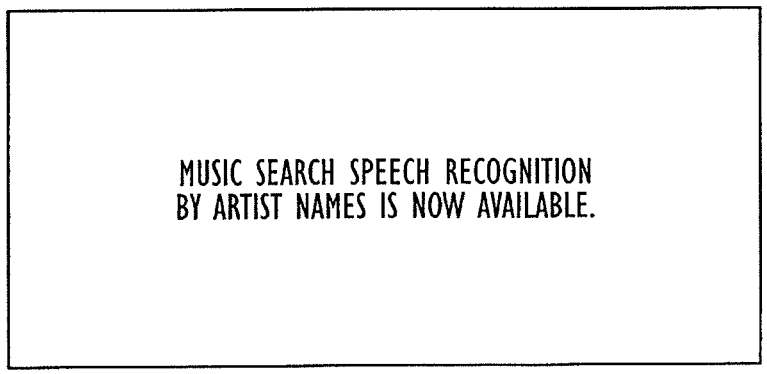
Figure 8A:
FIGS. 8A through 8C are diagrams showing different display screens.
Figure 8B:
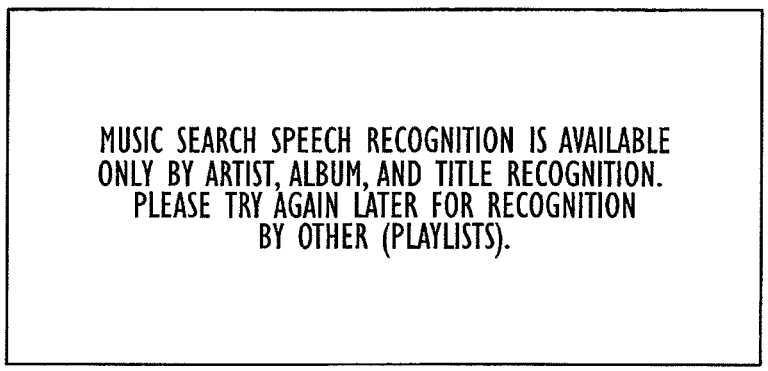
Figure 8C:
Figure 10A:
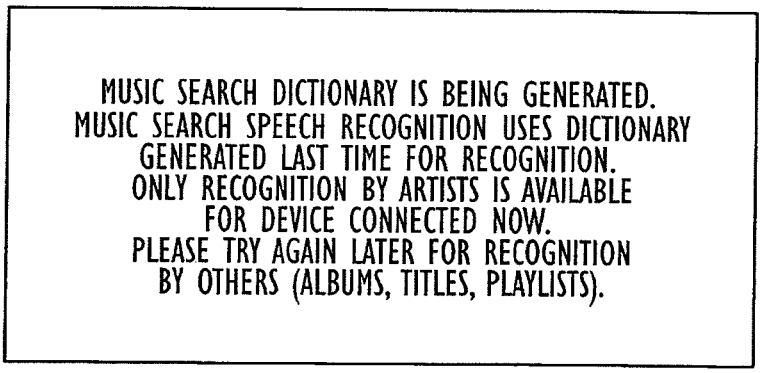
FIGS. 10A through 10C are diagrams showing different display screens.
Figure 10B:
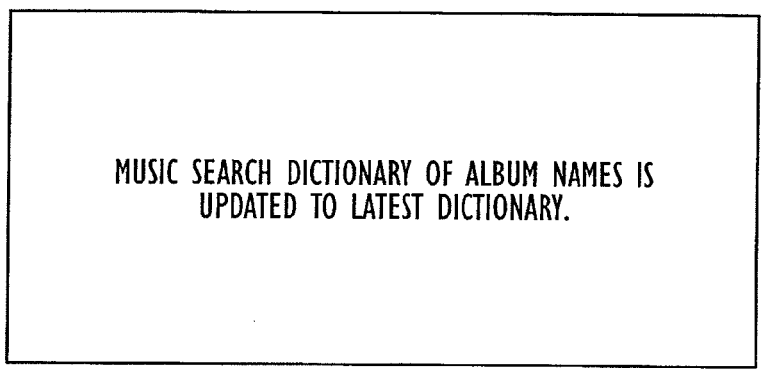
Figure 10C:
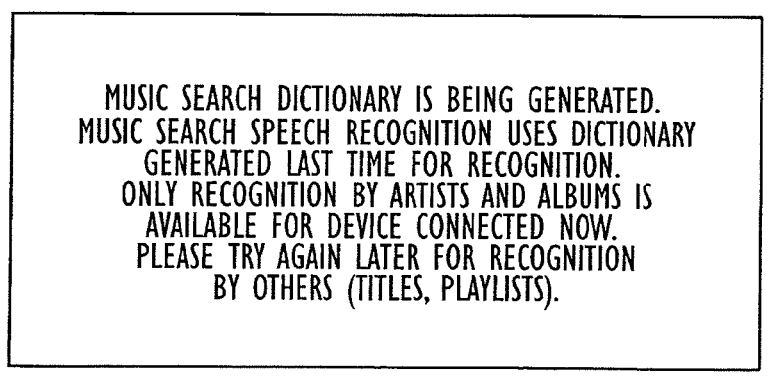
Figure 12:
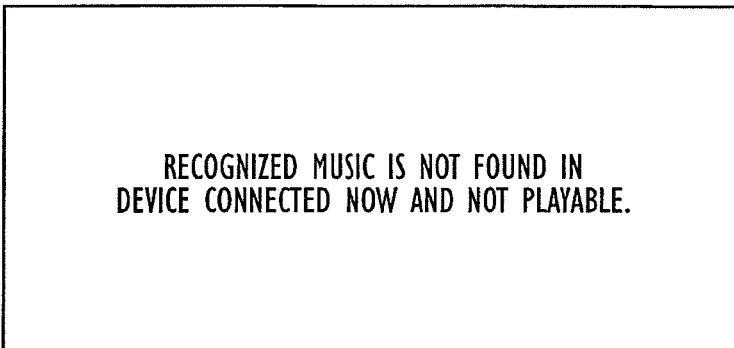
FIG. 12 is a diagram showing a different display screen.

In other words, for example, when the display screen shown in FIG. 6A is displayed, the user can know that generation of the latest dictionary data is started and speech recognition is not available. Also, when the display screen shown in FIG. 6B is displayed, the user can know that the latest dictionary data is being generated and speech recognition using the latest dictionary data becomes available shortly. Also, when the display screen shown in FIG. 6C is displayed, the user can know that generation of the dictionary data based on the name data of artist names is completed and speech recognition using the name data of latest artist names is available (dictionary data based on the name data of artist names has been generated).

On the other hand, in a case where the backup data is already saved when the USB memory 7 is connected to the speech recognition device 1, by controlling the display device 18 to sequentially display the display screens shown in FIG. 9A through FIG. 11C at timing at which generation of dictionary data based on the name data of artist names, album names, title names, and playlist names is started, at timing in the course of the generation, and at timing at which the generation is completed, the speech recognition device 1 notifies the user of a degree of progress in the same manner as above.

More specifically, for example, when the display screen shown in FIG. 9A is displayed, the user can know that generation of latest dictionary data is started and speech recognition using the latest dictionary data is not available but speech recognition using the dictionary data in the past is available. Also, when the display screen shown in FIG. 9B is displayed on the display screen, the user can know that the latest dictionary data is being generated and speech recognition using the latest dictionary data becomes available shortly. Also, when the display screen shown in FIG. 9C is displayed, the user can know that generation of the dictionary data based on the name data of artist names is completed and speech recognition using the name data of latest artist names is available (dictionary data based on the name data of artist names has been updated).

Besides the timing at which generation of dictionary data based on the name data is started, timing in the course of the generation, and timing at which the generation is completed as described above, the speech recognition device 1 controls the display device 18 to sequentially display display screens (not shown) notifying the user of a degree of progress in generation of the dictionary data in the same manner at timing at which generation of dictionary data based on paraphrase data corresponding to the artist names and paraphrase data corresponding to the album names is started, at timing in the course of the generation, and at timing at which the generation is completed. The term, "timing at which the generation is completed", means timing including timing at which dictionary registration is completed, that is, timing at which speech recognition becomes available. In a case where the speech recognition device 1 performs speech recognition of a speech specifying a name deleted from the USB memory 7, the speech recognition device 1 controls the display device 18 to display a display screen shown in FIG. 12 to notify the user of the deletion.

As has been described above, according to this embodiment, the speech recognition device 1 is configured in such a manner that generation of dictionary data based on the name data and the paraphrase data is started from one type of name to another and upon completion of the generation, the latest dictionary data is registered into the dictionary. The speech recognition device 1 can thus perform speech recognition using the latest dictionary data registered in the dictionary. Also, in a case where text information is acquired from a device same as the device for which the dictionary data was generated last time, when backup data corresponding to the text information acquired last time from the device same as the device from which text information this time is acquired is already generated, the dictionary data generated as the backup data is registered into the dictionary. The speech recognition device 1 can thus perform speech recognition using the dictionary data registered in the dictionary.

The dictionary data used when speech recognition is performed may be stored as a history, so that the frequency of use of the dictionary data when speech recognition was performed in the past is set as an order of priority according to the history and generation of dictionary data based on the name data and the paraphrase data is started in this order. When configured in this manner, dictionary data based on name data and paraphrase data with a high probability of use can be generated preferentially.

The number (data volume) of subjects for which dictionary data and paraphrase data are to be generated may be determined, so that the order of priority is set to an order from smaller to larger numbers of subjects and generation of the dictionary data based on the name data and the paraphrase data is started in this order. When configured in this manner, dictionary data based on name data and paraphrase data having fewer subjects can be generated preferentially.

When it is determined that the name data is not changed since the last connection after the dictionary data of the backup data is registered in the dictionary, generation of the dictionary data based on the name data is not started. Also, when it is determined that the paraphrase data is not changed since the last connection, generation of the dictionary data based on the paraphrase data is not started. Owing to this configuration, the speech recognition device 1 can perform speech recognition using the dictionary data of the backup data that is registered in the dictionary before a determination is made as to whether the name data and the paraphrase data is changed since the last connection.

In a state in which the backup data is already generated, a notification is provided on a one-by-one basis as to by which names the speech recognition using the dictionary data based on the latest name data and the latest paraphrase data is available and by which names the speech recognition using the dictionary data based on the name data and the paraphrase data in the past is available. Owing to this configuration, the user can know on every occasion that the dictionary data based on the name data and the paraphrase data is updated and that speech recognition using the latest name data and the latest paraphrase data is available.

Even in a state in which the backup data is not generated, a notification is provided on a one-by-one basis as to by which names speech recognition using the dictionary data based on the latest name data and the latest paraphrase data is available. Owing to this configuration, the user can know on every occasion that the dictionary data based on the name data and the paraphrase data is now generated and that speech recognition using the latest name data and the latest paraphrase data is available.

This disclosure is not necessarily applied to a device installable to a vehicle. For example, this disclosure may be applied to a device installed inside a building, for example, a user's house. In short, this disclosure is also applicable to a device used in circumstances where a vehicle is not involved at all.

The device is not limited to a USB memory and can be other devices, for example, a music playback terminal. In a case where the device is a music playback terminal, it may be configured in such a manner that the speech recognition device acquires music information from the music playback terminal by making Bluetooth (registered trademark) communications between the speech recognition device and the music playback terminal.

The text information is not limited to music information and can be telephone directory information or place-name information. In a case where the text information is telephone directory information, dictionary data based on name data including names of registrants, fixed phone numbers, mobile phone numbers, and so on may be started from one type of name to another. In this case, for example, nicknames of individuals may be adopted as the paraphrase data. In a case where the text information is place-name information, dictionary data based on name data including names of facilities, phone numbers and addresses of facilities, and so on may be started from one type to name to another. In this case, for example, abbreviated names of facilities may be adopted as the paraphrase data.

Instead of displaying the display screens shown in FIG. 6A through FIG. 12, a speech informing a degree of progress as to generation of the dictionary data may be outputted to provide such a notification. Alternatively, a display of the display screens and an output of the speech may be combined.

In a case where speech recognition is performed using the dictionary data in the past while the latest dictionary data is being generated, a notification may be provided together with an output of the recognition result to inform that the speech result was obtained by speech recognition using the dictionary data in the past.

It may be configured in such a manner that the function to playback music is furnished with a device different from the speech recognition device.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

The invention claimed is:

1. A speech recognition device comprising:
at least one processor, the at least one processor is configured to:
acquire, by a text information acquisition device, text information including a plurality of name data from an external device;
generate, by a dictionary data generation device, dictionary data for each type of the plurality of name data based on the plurality of name data included in the text information acquired by the text information acquisition device;
control, by a dictionary data saving control device, a dictionary data saving device to store the dictionary data generated by the dictionary data generation device;
register, by a dictionary registration device, the dictionary data, which is stored in the dictionary data saving device, for each type of the plurality of name data, into a dictionary;
perform, by a speech recognition device, speech recognition using the dictionary data registered in the dictionary; and
generate, by a backup data generation device, backup data of the dictionary data for each type of the plurality of name data stored in the dictionary data saving device,
wherein the at least one processor is further configured to:
generate, by the dictionary data generation device, the dictionary data for each type of name based on the name data; and
in a case where the text information acquired from the external device at a present moment is the same as the text information acquired just at a last time from the external device, and the backup data corresponding to the text information acquired from the external device at the present moment is already generated by the backup data generation device,
register, by the dictionary registration device, as the backup data in the dictionary, for each type of the plurality of name data, the dictionary data which is generated, and
then register, by the dictionary registration device, into the dictionary, the dictionary data for each type of the plurality of name data based on given name data, every time the dictionary data generation device completes generation of the dictionary data for each type of the plurality of name data based on the given name data,
wherein there are a plurality of types of name data, the plurality of types of name data including each type of the plurality of name data, wherein each of the types of name data has subjects,
wherein the processor is further configured to set an order of processing the types of name data, wherein the order is based on smaller to larger data volume of the subjects for each of the types of name data, and the dictionary data generation device generates the dictionary data based on the name data in the order from smaller to larger data volume of the subjects, for which the dictionary data is generated.

2. The speech recognition device according to claim 1, wherein:
the dictionary data generation device generates the dictionary data based on the name data in an order from higher to lower frequencies of use as the dictionary data when the speech recognition device has performed speech recognition in the past.

3. The speech recognition device according to claim 1, wherein:
when given name data is changed since the text information has been acquired the last time, the dictionary data generation device generates dictionary data based on changed name data; and
when given name data is not changed since the text information has been acquired the last time, the dictionary data generation device skips generation of dictionary data based on unchanged name data.

4. The speech recognition device according to claim 1, wherein the at least one processor is further configured to
correlate, by a correlation device, a given name with paraphrase data,
wherein:
the dictionary data generation device generates the dictionary data based on the paraphrase data correlated with the given name by the correlation device, wherein generating the dictionary data is after the generation of the dictionary data based on all of the name data is completed; and
when the dictionary data generation device completes generation of dictionary data based on the paraphrase data, then the dictionary registration device registers the dictionary data based on the paraphrase data into the dictionary.

5. The speech recognition device according to claim 4, wherein:
when the correlation device respectively correlates a plurality of names with a plurality of paraphrase data, the dictionary data generation device generates dictionary data based on the plurality of paraphrase data for each type of name; and
every time the dictionary data generation device completes generation of dictionary data based on given paraphrase data, the dictionary registration device registers the dictionary data based on the given paraphrase data into the dictionary.

6. The speech recognition device according to claim 4, wherein:
the dictionary data generation device generates the dictionary data based on the plurality of paraphrase data in an order from higher to lower frequencies of use of the paraphrase data as the dictionary data when the speech recognition device has performed speech recognition in the past.

7. The speech recognition device according to claim 4, wherein:
when given paraphrase data is changed since the text information has been acquired the last time, the dictionary data generation device generates dictionary data based on changed paraphrase data; and
when given paraphrase data is not changed since the text information has been acquired the last time, the dictionary data generation device skips generation of dictionary data based on unchanged paraphrase data.

8. The speech recognition device according to claim 1, further comprising:
a notification control device that provides a notification using a notification device that speech recognition using the backup data by the speech recognition device is available when the backup data is already generated by the backup data generation device in a period, during which the dictionary data generation device is generating the dictionary data and the dictionary registration device is registering the dictionary data into the dictionary.

9. The speech recognition device according to claim 8, wherein:
when the dictionary data generation device completes generation of dictionary data based on the name data and the paraphrase data, the notification control device provides a notification using the notification device that speech recognition using the dictionary data by the speech recognition device is available.

10. The speech recognition device according to claim 9, wherein:
the notification control device provides a notification using the notification device immediately after the dictionary data generation device completes generation of dictionary data based on the name data and the paraphrase data that speech recognition using the dictionary data by the speech recognition device is available.

11. The speech recognition device according to claim 1, further comprising:
a notification control device that provides a notification using the notification device after generation of dictionary data based on the name data and the paraphrase data is completed by the dictionary data generation device that speech recognition using the dictionary data by the speech recognition device is available when the backup data is not generated by the backup data generation device in a period, during which the dictionary data generation device is generating the dictionary data.

12. The speech recognition device according to claim 1, wherein:
the text information acquisition device acquires music information including at least an artist name, an album name, a title name, and a playlist name as the text information.

13. The speech recognition device according to claim 1, wherein:
the types of the plurality of name data, in the plurality of name data acquired by the text information acquisition device, include at least an artist name, an album name, a title name, and a playlist name.

14. The speech recognition device according to claim 1, wherein
the text information acquisition device acquires music information from the external device, wherein the music information acquired by the text information acquisition device includes the text information that includes the plurality of name data on which the generated dictionary data is based,
the music information acquired as the text information by the text information acquisition device conforms to a standard pre-defined file format,
the standard pre-defined file format specifies a plurality of types of name data, wherein the plurality of types of name data includes each type of the plurality of name data,
the name data contained in the music information include one or more of: name data of artist names, name data of album names, name data of title names, and name data of playlist names.

15. The speech recognition device according to claim 1, wherein
the text information acquisition device acquires music information from the external device, wherein the music information acquired by the text information acquisition device includes the text information that includes the plurality of name data on which the generated dictionary data is based,
the music information acquired as the text information by the text information acquisition device conforms to an mp3 file format or a wmv file format.

16. A speech recognition device comprising:
at least one processor, the at least one processor is configured to:
acquire, by a text information acquisition device, text information including a plurality of name data from an external device;
generate, by a dictionary data generation device, dictionary data for each type of the plurality of name data based on the plurality of name data included in the text information acquired by the text information acquisition device;
control, be a dictionary data saving control device, a dictionary data saving device to store the dictionary data generated by the dictionary data generation device;
register, by a dictionary registration device, speech recognition using the dictionary data registered in the dictionary; and
generate, by a backup data generation device, backup data of the dictionary data for each type of the plurality of name data stored in the dictionary data saving device,
wherein the at least one processor is further configured to:
generate, by the dictionary data generation device, the dictionary data for each type of name based on the name data; and
in a case where the text information acquired from the external device at a present moment is the same as the text information acquired just at a last time from the external device, and the backup data corresponding to the text information acquired from the external device at the present moment is already generated by the backup data generation device,
register, by the dictionary registration device, as the backup data in the dictionary, for each type of the plurality of name data, the dictionary data which is generated, and
then register, by the dictionary registration device, into the dictionary, the dictionary data for each type of the plurality of name data based on given name data, every time the dictionary data generation device completes generation of the dictionary data for each type of the plurality of name data based on the given name data, wherein the at least one processor is further configured to correlate, by a correlation device, a given name with paraphrase data, wherein the dictionary data generation device generates the dictionary data based on the paraphrase data correlated with the given name by the correlation device, wherein generating the dictionary data is after the generation of the dictionary data based on all of the name data is completed, wherein, when the dictionary data generation device completes generation of dictionary data based on the paraphrase data, then the dictionary registration device registers the dictionary data based on the paraphrase data into the dictionary wherein there are a plurality of types of name data, the plurality of types of name data including each type of the plurality of name data, wherein each of the types of name data has subjects, and wherein the processor is further configured to set an order of processing the types of name data, the order is based on smaller to larger data volume of the subjects for each of the types of name data, and the dictionary data generation device generates the dictionary data based on the plurality of paraphrase data in the order from smaller to larger data volume of the subjects, for which the dictionary data is generated.

17. A speech recognition device comprising:
at least one processor, the at least one processor is configured to:
acquire, by a text information acquisition device, text information including a plurality of name data from an external device;
generate, by a dictionary data generation device, dictionary data for each type of the plurality of name data based on the plurality of name data included in the text information acquired by the text information acquisition device;
control, by a dictionary data saving control device, a dictionary data saving device to store the dictionary data generated by the dictionary data generation device;
register, by a dictionary registration device, the dictionary data, which is stored in the dictionary data saving device, for each type of the plurality of name data, into a dictionary;
perform, by a speech recognition device, speech recognition using the dictionary data registered in the dictionary; and
generate, by a backup data generation device, backup data of the dictionary data for each type of the plurality of name data stored in the dictionary data saving device, wherein the at least one processor is further configured to:
generate, by the dictionary data generation device, the dictionary data for each type of name based on the name data; and
in a case where the text information acquired from the external device at a present moment is the same as the text information acquired just at a last time from the external device, and the backup data corresponding to the text information acquired from the external device at the present moment is already generated by the backup data generation device,
register, by the dictionary registration device, as the backup data in the dictionary, for each type of the plurality of name data, the dictionary data which is generated, and
then register, by the dictionary registration device, into the dictionary, the dictionary data for each type of the plurality of name data based on given name data, every time the dictionary data generation device completes generation of the dictionary data for each type of the plurality of name data based on the given name data, wherein the performing of the speech recognition is executable after the dictionary data for each type of name is registered in the dictionary;

wherein, when a new dictionary data is generated and registered, the at least one processor is further configured to:
register, by the dictionary registration device, the backup data in the dictionary in order to enable the speech recognition; and
register, by the dictionary registration device, the new dictionary data for each type of name in the dictionary so as to update the dictionary every time the new dictionary data for each type of name is generated, wherein there are a plurality of types of name data, the plurality of types of name data including each type of the plurality of name data, wherein each of the types of name data has subjects, wherein the processor is further configured to set an order of processing the types of name data, wherein the order is based on smaller to larger data volume of the subjects for each of the types of name data, and the dictionary data generation device generates the dictionary data based on the name data in the order from smaller to larger data volume of the subjects, for which the dictionary data is generated.

* * * * *